United States Patent [19]
Suzuki et al.

[11] Patent Number: 6,049,151
[45] Date of Patent: *Apr. 11, 2000

[54] LINEAR MOTOR STRUCTURE

[75] Inventors: Yuzuru Suzuki; Hirohito Nakamata, both of Shizuoka, Japan

[73] Assignee: Minebea Co., Ltd, Nagano, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/797,508

[22] Filed: Feb. 6, 1997

[30] Foreign Application Priority Data

Mar. 8, 1996 [JP] Japan ................................. 8-080887

[51] Int. Cl.⁷ .................................................. H02K 37/00
[52] U.S. Cl. ............................... 310/80; 310/14; 310/43; 310/45
[58] Field of Search ........................ 310/80, 14, 12, 310/43, 44, 45; 384/13, 290

[56] References Cited

U.S. PATENT DOCUMENTS

| | | | |
|---|---|---|---|
| 4,098,515 | 7/1978 | Sakata | 277/165 |
| 4,286,180 | 8/1981 | Langley | 310/12 |
| 4,432,883 | 2/1984 | Denzine et al. | 252/12 |
| 4,582,368 | 4/1986 | Fujita et al. | 308/5 R |
| 4,693,580 | 9/1987 | Hanamori et al. | 354/271.1 |
| 5,094,907 | 3/1992 | Yamamura et al. | 428/285 |
| 5,137,374 | 8/1992 | Orkin | 384/298 |
| 5,254,892 | 10/1993 | Bosman et al. | 310/49 R |
| 5,289,067 | 2/1994 | Tanaka et al. | 310/90.5 |
| 5,404,060 | 4/1995 | Nakahashi et al. | 310/83 |
| 5,426,988 | 6/1995 | Ohata et al. | 74/55 |
| 5,462,362 | 10/1995 | Yuhta et al. | 384/13 |

FOREIGN PATENT DOCUMENTS 09009567  1/1997  Japan .

*Primary Examiner*—Nestor Ramirez
*Assistant Examiner*—Burton Mullins
*Attorney, Agent, or Firm*—Staas & Halsey LLP

[57] ABSTRACT

A motor structure having an output shaft with a male screw part mating with a female screw part provided on a rotor rotated by electromagnetic interaction to move the output shaft in an axial direction. The female screw is formed of PPS resin, and the male screw part is formed of metal with a silicon nitride surface layer.

1 Claim, 6 Drawing Sheets

_6,049,151_

LINEAR MOTOR STRUCTURE

BACKGROUND OF THE INVENTION

1. Field of the Invention

This invention relates to a motor structure usable as a driving source to cause a linear movement such as a head actuator of a floppy disc driving device (hereinafter referred to as an FDD), and more particularly, to a motor structure where a pair of sliding parts engage each other to convey a driving force, and further to a motor structure equipped with means for preventing its linearly moving output shaft from rotating.

1. Description of the Prior Art

In a linear actuator using a two-phase synchronous motor such as an actuator of an FDD, it is well known to use screw means to convert a moving direction. A screw structure using a ball is employed to reduce a frictional loss caused therein and attain high output and high efficiency, as disclosed in Japanese Utility Model Laid-Open No. 62-3080. Therefore, such an actuator structure is expensive because of installing balls, and so it may be applied only in a limited technical field. On the other hand, a screw structure without balls is inexpensive, but it is remarkably inferior in conversion efficiency due to a large frictional loss. Additionally, it is remarkably inferior in durability because of a large abrasion loss of resin of the screw, and then it is far from an actual use. Such abrasion occurs markedly, in particular, when a range of working temperature becomes wide. Referring to another problem in this prior art, means for preventing an output shaft from rotating is installed in a device receiving an output from a motor so that the device requires a mounting space therefor. It is not preferable for downsizing of the equipment. Further, since it results in controlling an output shaft movement precisely by using two or more regulating parts, such control is too complicated.

Although it is generally known that a preferable result such as reduction in abrasion loss can be obtained by using a resin for a female screw and metal for a male screw in a motion conversion mechanism with a screw, it can be barely proved, in substance, that the so-called scuffing or seizure of the sliding parts is hardly caused to stabilize the sliding parts by selecting, as the materials for the sliding parts, those differing in hardness so as to minimize the friction as much as possible; and the fact is that each determines after examination to which part the resin is used, or which resin is suitable therefor according to the purpose of use. Since the output shaft is provided with many sliding parts, it is apt to hit itself against a bench or another part at handling. Consequently, the output shaft must be formed of a material strong enough to hold, preferably formed of a metal.

SUMMARY OF THE INVENTION

This invention is presented to overcome the above problems, and it has an object to provide a motor structure having sliding parts which are highly durable even when it is subject to a wide temperature range, and another object is to provide a motor structure wherein the above sliding parts are provided as a rotation preventing mechanism for an output shaft, and a further object is to provide a motor structure wherein the above sliding parts are provided as a screw structure to transfer a driving force to an output shaft.

To solve the problems as described above, this invention provides a motor structure having at least two sliding parts engaged with each other through which a driving force is transferred, wherein a surface material of one sliding part is of polyphenylene sulfide (PPS) resin and a surface material of the other sliding part is of a nitride layer. In addition, this invention provides a motor structure having an output screw shaft with a screw portion engaged with a screw part provided on the center of a rotor rotated by electromagnetic interaction to move the output shaft in its axial direction by the rotation of the rotor, either one of the sliding contact parts being formed of PPS resin, the other being formed of metal, on the surface of which a nitride layer is formed. The above sliding contact parts include the screw part between the center portion of the rotor and the output shaft, and the output shaft and a through-hole part for the output shaft provided on a stator housing. As specific examples, the female screw is formed of PPS resin having a high heat resistance and a small linear expansion coefficient so as to minimize the friction resistance between the female screw and the male screw, metal is used for the male screw formed on an outer surface of the output shaft. The other sliding part on the output shaft is formed in such a way that a longitudinal portion of the output shaft having a D-shaped cross section is cut away to form a plain surface thereon in order to prevent a rotation of the output shaft. The surface of the output shaft which is forced to move in a longitudinal direction is subjected to nitriding, whereby the friction is further reduced, and the durability is also improved. Thus, a linear actuator highly durable with a simple structure and usable within a wide temperature range can be obtained.

DESCRIPTION OF THE PREFERRED EMBODIMENTS

Figure 1:
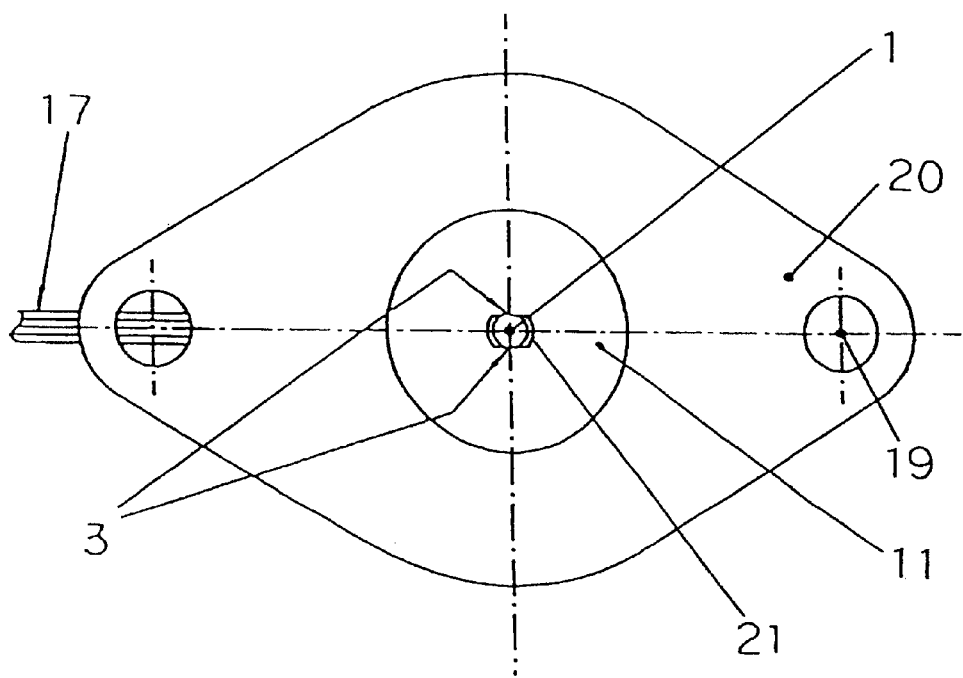
FIG. 1 shows a plane view of one embodiment of this invention.
Figure 2:
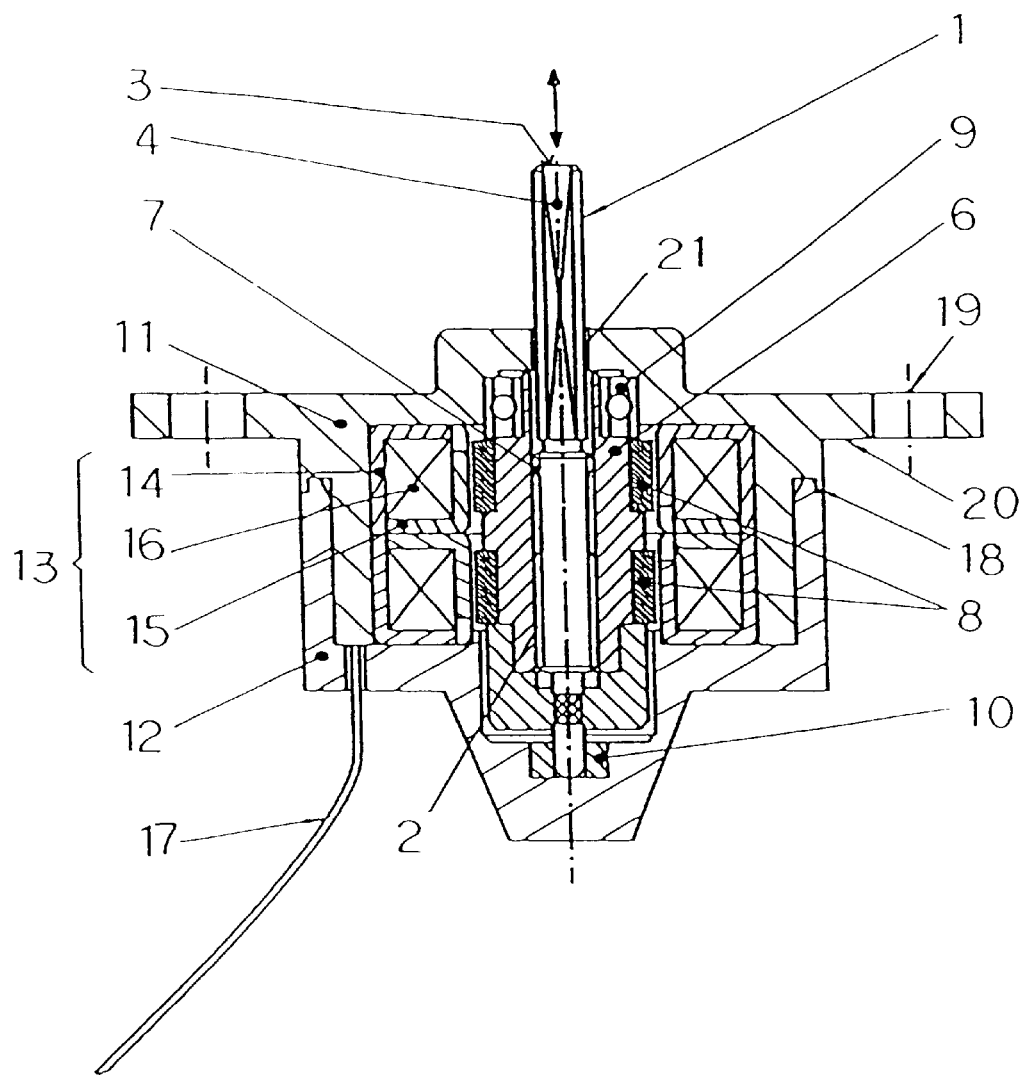
FIG. 2 is a vertical section view showing one embodiment of this invention.
Figure 3:
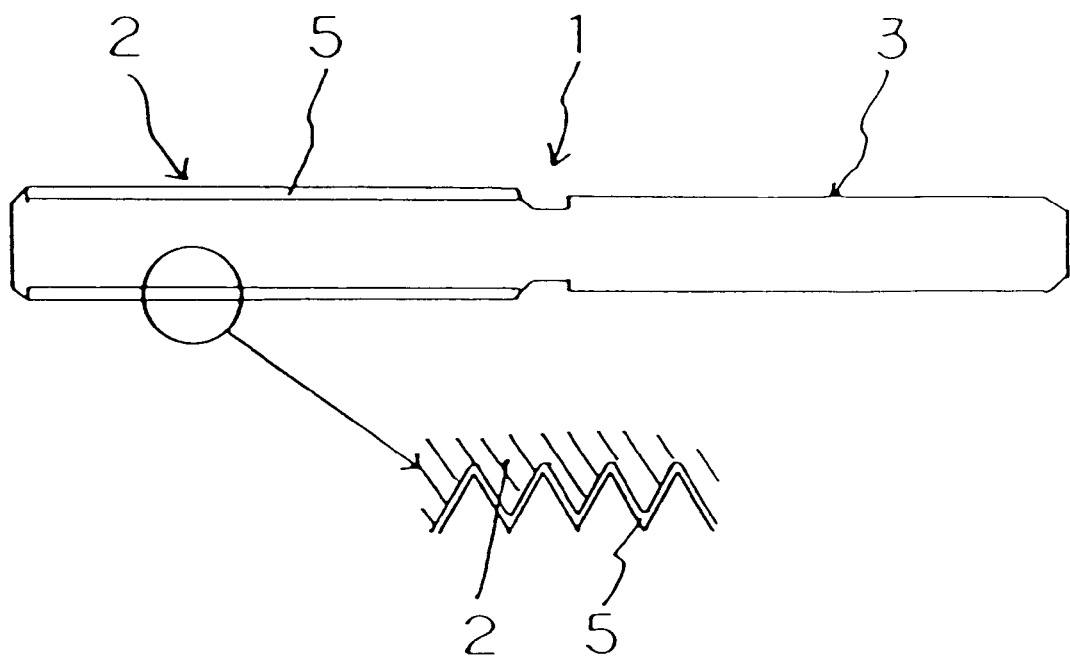
FIG. 3 is a section view of an output shaft.

One embodiment of this invention is illustrated in detail in reference to the accompanying drawings. FIG. 1 is a plane view showing one embodiment of the invention, and FIG. 2 is a vertical section view of the same. In these drawings, denoted at numeral 1 is an output shaft, which has a male screw part 2 made of stainless steel, a pair of rotation preventing D-cut parts 3 (as illustrated later in detail) provided in order to prevent the rotation of the output shaft 1, and plane surfaces 4 formed on the D-cut parts 3. As shown in FIG. 3, a nitride layer 5 is formed on the surface of the output shaft 1, particularly, on the surface of the male screw part 2 so as to reduce the frictional resistance and improve the durability. The nitride layer 5 is a ceramic thin layer, for example, a nitride such as silicon nitride, which can be formed on the surface of the output shaft 1 by a known method such as PVD or CVD, and this nitriding can be also performed by a treatment for generating a compound such as iron nitride, that is, a TUFFTRIDE treatment (salt bath method) or sulfunite (PVD method). The nitride layer 5 is about 10 micrometers in thickness. The nitride layer 5 may be provided on a whole surface of the output shaft 1, or only on a whole surface part of the male screw part 2.

Denoted at a numeral 6 is a rotor sleeve formed of PPS resin, which has on its bore side a female screw part 7 engaged with the male screw part 2 of the output shaft 1, and a rotor magnet part 8 of permanent magnet fitted and adhered to the outer circumference. The rotor sleeve 6 is made of the PPS resin, whereby the heat resistant temperature is increased, compared with polyacetal resin most frequently used as a sliding material in the past, so that the using environment can be set widely.

The rotor sleeve 6 has bearings 9, 10 on both ends respectively, and the rotor sleeve 6 is rotatably held by both of the bearings 9 in a stator housing 11 and the bearings 10 in a cover 12. A stator assembly 13 is composed of stator yokes 14, 15 and a coil 16. More specifically, this embodiment is related to a two-phase synchronous motor having a stator including of a stator yoke formed by three-dimensionally bending a steel plate of a soft magnetic material and a coil formed by winding a wire including a polyurethane resin-covered conductor on a bobbin; and a rotor having a screw type motion conversion mechanism for converting a rotary motion to a linear motion on the inner circumference of a rotor magnet having of a field permanent magnet provided so as to be opposite, with a fine space, to the outer circumference of an armature having of a permanent magnet opposed to the pole teeth of the stator through a cavity, and having a linearly moving output shaft, and it has the same structure as the stator of a so-called 2 phase claw pole type stepping motor. Denoted at 17 is the lead wires of the coils 16.

The rotor magnet 8 and the stator assembly 13 are concentrically arranged with a fine space, and the stator assembly 13 is housed in the stator housing 11. The cover 12 is centered with the stator housing 11 by means of a fitting part 18. A flange 20 having motor mounting holes 19 is integrated to the stator housing 11.

The operation of this invention is further illustrated. When a prescribed pulse driving voltage is applied to the lead wires 17 of the coils 16 in the state shown in FIG. 2, the rotor sleeve 6 starts to rotate, for example, clockwise by the interaction between the magnetic flux generated from the coils 16 and the magnetic flux generated from the rotor magnets 8. The output shaft 1 screwed to the inside of the rotor sleeve 6 also is forced to rotate together with it by the rotation of the rotor sleeve 6. However, the rotation preventing D-cut part 3 is formed on the upper part of the output shaft 1, and this part passes through a through-hole 21 bored in the stator housing 11. Since this through-hole 21 further has a flat part to be fitted to the flat part of the rotation preventing D-cut part 3 of the output shaft 1, the output shaft 1 can not rotate. Thus, the output shaft 1 is moved, for example, upward as designated by the arrow because of a working of the screw structure in which the male screw part 2 is screwed to the female screw part 7. When the rotor sleeve 6 is rotated in the opposite direction to the above, the output shaft 1 is moved downward according to the arrow.

As described above for the constitution, the female screw part 7 is formed of PPS resin, the male screw part 2 has a structure in which the surface of metal is covered with the nitride layer, and the contact surfaces of the screws thus substantially includes the PPS resin and the nitride. This combination in the contact surface minimizes the abrasion loss of the PPS resin part with the lapse of time. Therefore, the positional precision of the output shaft 1 is held more precise than in a conventional one even in case of a long-term contact, and the positional precision of a data read and write head provided on a floppy disk which is a memory device for a computer, for example, can be held for a long time.

Figure 4:
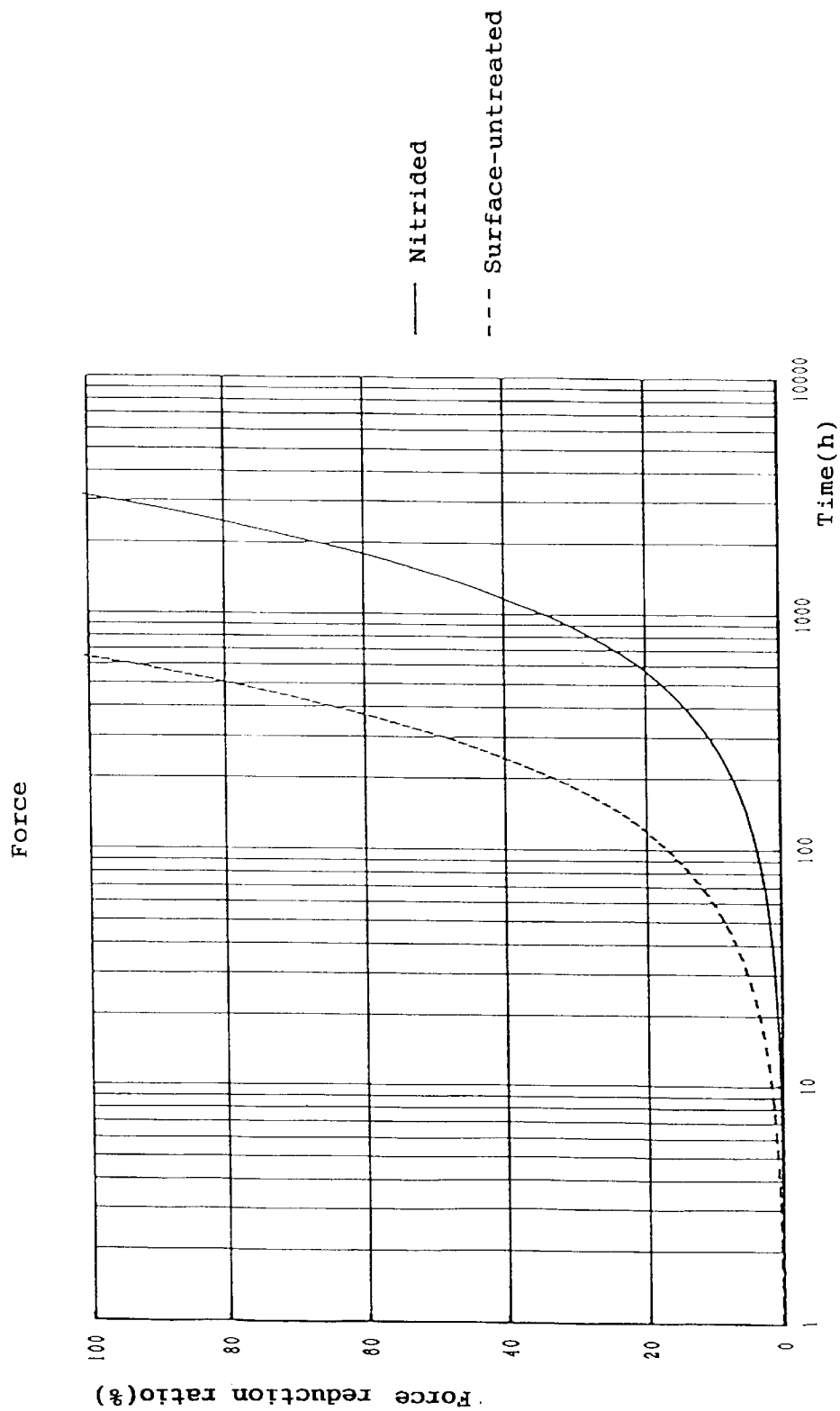
FIG. 4 is a characteristic curve showing a change of a force depending on the presence of a surface treatment in an endurance test of one embodiment of this invention.
Figure 5:
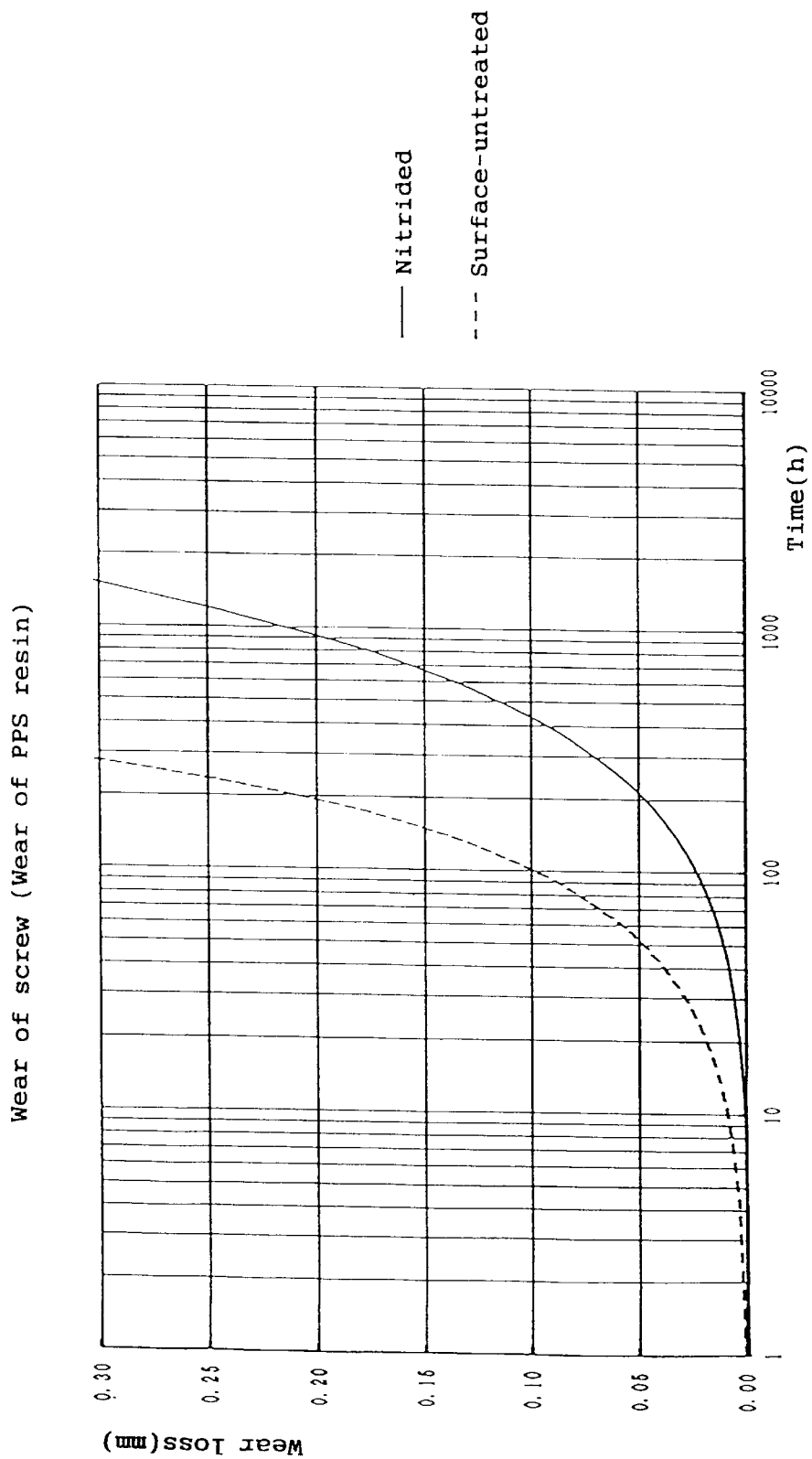
FIG. 5 is a comparative characteristic curve showing the relation between the surface treatment and the wear loss of the output shaft in one embodiment of this invention.

FIGS. 4 and 5 are characteristic curves for backing up these effects, in which FIG. 4 is a characteristic curve showing a change of a force depending on the presence of the surface treatment in an endurance test, and FIG. 5 is a comparative characteristic curve showing the relation between the surface treatment of the output shaft which is the most important in this invention and the wear loss. As is apparent from FIG. 4, the reduction of the force in a conventional example shown by a dotted line becomes conspicuous, compared with that in this invention, from when about 10 hours passed after use, and the force in the conventional example is more conspicuously reduced beyond comparison with that in this invention when it exceeds 1000 hours.

As apparent from FIG. 5, the wear of the screw part, particularly, the PPS resin part in the conventional example shown by the dotted line also becomes conspicuous from when about 10 hours passed after use, compared with that in this invention, and the wear loss is increased more beyond comparison with that in this invention when it exceeds 1000 hours. It is found from these drawings that a remarkable difference comes out in the force of the output shaft 1 and the wear loss of the screw with the lapse of time depending on the presence of the surface treatment.

In the above embodiment, the output shaft 1 is formed of metal, and the rotor sleeve 6 is formed of PPS resin. However, a structure such that the output shaft 1 is formed of PPS resin, the screw on the inner circumference of the rotor sleeve 6 is formed of metal, and the nitride layer is formed on its surface may be employed.

Figure 6:
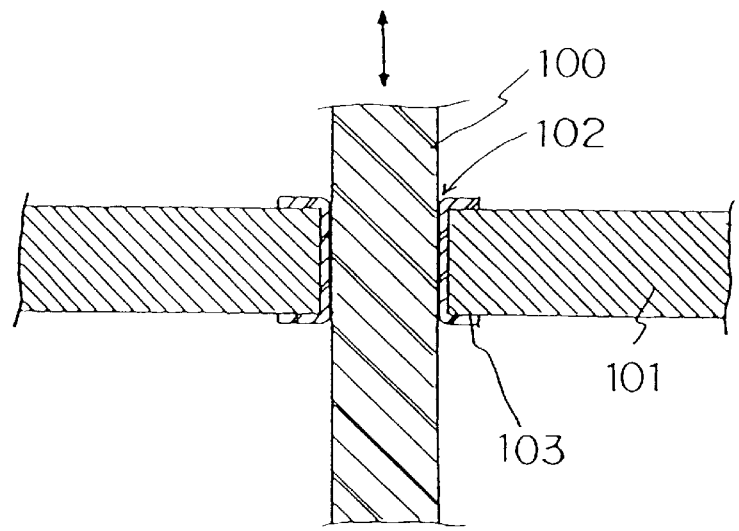
FIG. 6 is a partial section view showing another embodiment of this invention.

Another preferred embodiment of this invention is then described in reference to the drawings. In this embodiment, the contact structure between PPS resin and a nitride layer formed on the surface of metal, which is the essential part of this invention, is applied to the contact part between an output shaft and a through-hole for passing it. FIG. 6 is a partial section view showing the state where an output shaft 100 passes through a stator housing 101. In this embodiment, the output shaft 100 is formed of PPS resin. The stator housing 101 is formed of metal such as steel. The output shaft 100 passes through a through-hole 102 bored in the stator housing 101, and vertically moved in the arrowed direction by a two-phase synchronous motor in the same manner as the embodiment described above. A nitride layer 103 is formed on an inner edge of the through-hole 102 bored in the stator housing 101. The nitride layer 103 may be formed by applying a polycarboxysilane solution or organic silicon polymer to the circumferential surface of the through-hole 102, followed by baking in an ammonia atmosphere.

Figure 7:
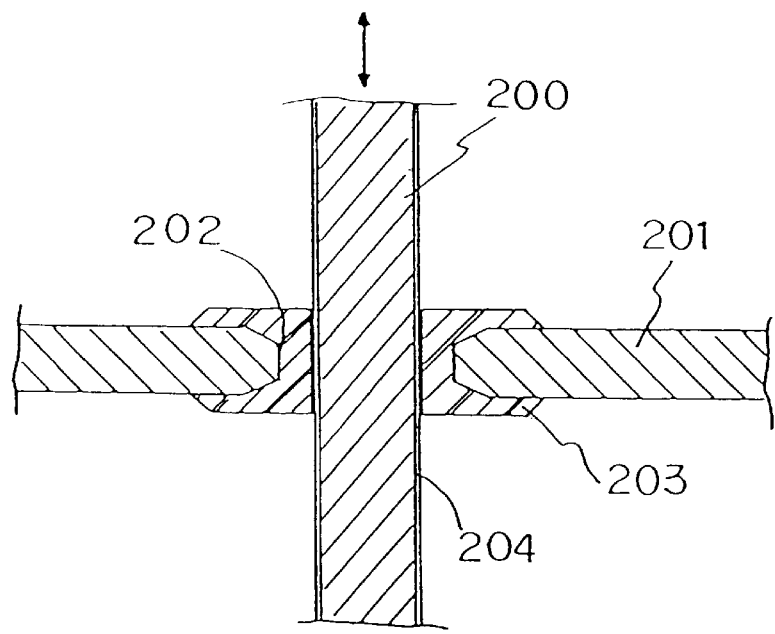
FIG. 7 is a partial section view showing a further embodiment of this invention.

A further preferred embodiment of this invention is illustrated in detail in reference to the drawing(FIG. 7). In this embodiment, the sliding contact structure between PPS resin and a nitride layer formed on the surface of metal, which is the essential part of this invention similarly to the above, is applied to the sliding contact part between an output shaft and a through-hole for passing it. FIG. 7 is a partial section view showing the state where an output shaft 200 passes through a stator housing 201. In this embodiment, the output shaft 200 is formed of metal, and the stator housing 201 is also formed of metal. The stator housing 201 has a through hole 202, and a bearing ring 203 formed of PPS resin is fitted to the holding hole 202. The center hole of the bearing ring 203 has the same form as the cross sectional form of the output shaft 200. A nitride layer 204 is formed on the surface of the output shaft 200. The output shaft 200 in this embodiment is vertically moved in the arrowed direction by a two-phase synchronous motor in the same manner as the above embodiment.

As described in detail above, since either one of the sliding contact parts is formed of PPS resin, and the other is formed of metal, on the surface of which a nitride layer is formed, in the motor structure having an output shaft with a screw mating with a screw part provided in the center of a rotor rotated by electromagnetic interaction to move the output shaft in the axial direction by the rotation of the rotor, the wear resistance in the contact part of the motor structure is improved, the frictional resistance of the sliding contact part is never increased over a long time, compared with a conventional one, and many effects of invention such that the positional control of the head, when applied to a floppy disc driving device for a computer, can be precisely executed over a long time are provided.

What we claim is:

1. A linear motor structure having a stator and a rotor, comprising:
    a screw type motion conversion mechanism on the motor, having a female screw part, for converting a rotating motion of the motor to a linear motion; and
    a linearly moving output shaft having a male screw part which contacts the female screw part of the motion conversion mechanism,
    wherein the female screw part is formed of polyphenylene sulfide resin, and a surface of the male screw part that contacts the female screw part is covered by a silicon nitride ceramics thin layer.

* * * * *